United States Patent [19]
Espie et al.

[11] Patent Number: 5,712,726
[45] Date of Patent: Jan. 27, 1998

[54] COMPACT BINOCULARS FOR NIGHTTIME VISION

[75] Inventors: Jean-Luc Espie, Paris; Bruno Coumert, Etienne, both of France

[73] Assignee: Angenieux SA, Saint-Heand, France

[21] Appl. No.: 750,853

[22] PCT Filed: Jun. 16, 1995

[86] PCT No.: PCT/FR95/00799
  § 371 Date: Dec. 30, 1996
  § 102(e) Date: Dec. 30, 1996

[87] PCT Pub. No.: WO96/00924
  PCT Pub. Date: Jan. 11, 1996

[30] Foreign Application Priority Data

Jun. 28, 1994 [FR] France .................... 94 07951

[51] Int. Cl.$^6$ .................... G02B 23/00; G02B 27/02
[52] U.S. Cl. .................... 359/419; 359/400; 359/407; 359/482
[58] Field of Search .................... 359/353, 429, 359/364–365, 399–419, 480–482, 726–732, 850–860; 250/214 VT; 313/524

[56] References Cited

U.S. PATENT DOCUMENTS

| | | | |
|---|---|---|---|
| 2,426,207 | 8/1947 | Handy | 359/400 |
| 2,537,962 | 1/1951 | Brown | 359/407 |
| 4,383,741 | 5/1983 | Vogl et al. | 359/407 |
| 4,653,879 | 3/1987 | Filipovich | 359/400 |
| 4,826,302 | 5/1989 | Apsenius | 313/524 |

FOREIGN PATENT DOCUMENTS 2006463  5/1979  United Kingdom.

*Primary Examiner*—Thong Nguyen
*Attorney, Agent, or Firm*—Oblon, Spivak, McClelland, Maier & Neustadt, P.C.

[57] ABSTRACT

Compact binoculars for nighttime vision with a center of gravity close to the user. The binoculars have an optical architecture with an inclined principle pathway. The principle pathway extends by way of a first eyepiece pathway with a second eyepiece pathway branching in a different direction. The binoculars include a bent entrance objective conjugate with a light intensifier tube forming an image of a scene along a viewing axis. The image is next transmitted on the two eyepiece pathways to two eyepieces by way of an optical splitter. The splitter partially transmits the flux to a first eyepiece pathway inclined with respect to the plane of the eyepieces and on a second eyepiece pathway which has an axis lying in the plane perpendicular to the viewing axis and passing through the axis of the principle pathway.

8 Claims, 2 Drawing Sheets ns5,712,726

COMPACT BINOCULARS FOR NIGHTTIME VISION

BACKGROUND OF THE INVENTION

1. Field of the Invention

The invention relates to nighttime vision, that is to say the observation of a scene under very weak conditions of illumination provided for example by starlight or moonlight, and without additional lighting of the scene.

DISCUSSION OF THE BACKGROUND

Nighttime vision systems are designed to be carried in the hand or to allow hands-free use. In the latter case, the vision system is fixed to the user's face with the aid of a support mask fitted with straps or on a vehicle as is the case for example in respect of infrared periscopes of the type described for example in the GB Patent 918213.

Vision devices carried in the hand are principally intended for distant observation and incorporate an optical combination capable of multifold magnification of the observed field. On the other hand, nighttime vision systems of the hands-free type, intended for movement, vehicle driving or the carrying out of nighttime work, exhibit a magnification equal to one so as to offer natural conditions of vision. The invention is particularly, but not exclusively, intended for this type of application.

Nighttime vision systems are conventionally based on employing an image intensifier tube, including a photocathode serving as entrance surface, a microchannel electron transfer and multiplication system, and a phosphor screen serving as exit surface. A wide-aperture objective forms an image of the observed scene on the entrance surface, then the image is electronically intensified and finally restored on the phosphor screen so as to be observed through an eyepiece assembly.

Two-eyepiece vision is obtained by separating the flux exiting the tube into two eyepiece pathways with the aid of an optical splitter.

The need to fix night driving equipment to the head gives rise to the presence of significant ergonomic constraints. Thus, the mass of the equipment and its protuberant shape, owing to the alignment of the elements—objective, tube, eyepiece—on a viewing axis, give rise to a shift of the center of gravity of the head and modify its inertial characteristics, this causing problems of fatigue in the neck region. Moreover, the presence of this fragile and relatively long protuberance (conventionally between 100 and 170 mm) reduces the mobility of the user, especially in respect of movements under difficult conditions or in respect of vehicle driving.

To solve this problem, there is known from U.S. Pat. No. 4,826,302 a bent optical system in which the objective and the intensifier are oriented along a horizontal axis perpendicular to the viewing axis. The dimension of the equipment along the viewing axis is thereby reduced and the center of gravity of the assembly is shifted towards the observer. However, this design requires that a significant number of reflections be employed on each of the optical pathways.

SUMMARY OF THE INVENTION

The invention aims to obtain even more compact nighttime vision binoculars employing a reduced number of optical elements.

To achieve these objectives, the invention is based on setting up a principal optical pathway inclined with respect to the plane of the optical axes of the eyepieces and culminating in a first eyepiece pathway onto which will be grafted a second eyepiece pathway.

More precisely, the subject of the invention is binoculars for nighttime vision including an entrance objective conjugate with a light-intensifier tube for forming an image of a scene from light flux originating from the scene along a viewing axis, an intensified image next being transmitted by an image transport and by an optical splitter which partially transmits the flux by transmission and reflection respectively on a first pathway to a first eyepiece and on a second pathway, which is bent twice, to a second eyepiece, the eyepieces having axes parallel to the viewing axis, characterized in that the tube and the image transport are aligned so as to constitute a principal optical pathway along a principal optical axis lying in a plane perpendicular to the viewing axis and inclined with respect to the plane of the axes of the eyepieces, in that the second eyepiece pathway, which is bent twice and which has an axis lying in the plane perpendicular to the viewing axis and passing through the axis of the principal pathway. According to a first example embodiment, the transmission of flux is carried out with the aid of an image transport optic composed of a first element located between the tube and the splitter and of a second element located on each of the eyepiece pathways. This optical combination therefore forms two image transport optics, one transport by transmission through the splitter and one transport by reflection on the separator, respectively on the first and the second eyepiece pathway. Each image transport forms with the conjugate eyepiece an eyepiece assembly, preferably of the microscope type.

Advantageously, the transmission of the flux on the second eyepiece pathway is carried out either with the aid of optical elements constituting a single image transport coupled to two roof prisms, or with the aid of two image transports coupled to two plane reflectors. An optic of the magnifying glass type which directly recasts the image from the screen of the tube.

According to a second example embodiment, the intensifier tube has image inverter fibres. Advantageously, the roof prisms of the second eyepiece pathway are then replaced by plane reflectors. Moreover, the transmission of the flux on the first eyepiece pathway constituting an optic of the magnifying glass type which directly recasts the image from the screen of the tube.

BRIEF DESCRIPTION OF THE DRAWINGS

Other characteristics and advantages will emerge on reading the following description accompanied by the appended figures which respectively represent.

DISCUSSION OF THE PREFERRED EMBODIMENTS

Figure 1:
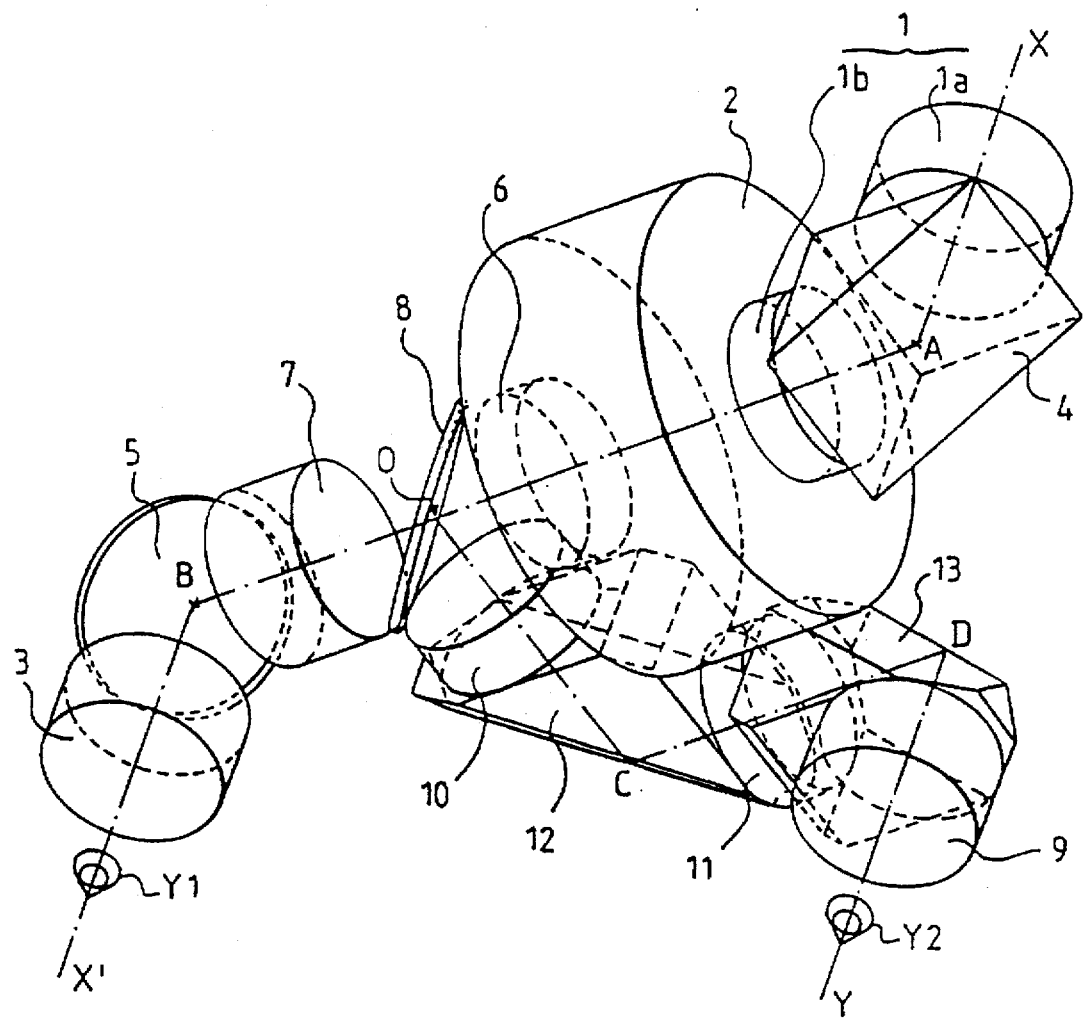
FIG. 1, a first example embodiment of the nighttime vision binoculars according to the invention.

The first example embodiment, illustrated by FIG. 1, shows the basic arrangement proposed by the invention: a principal optical pathway with axis XAOBX', bent at A and B and hinged about three axes, the viewing axis AX of the binoculars, the optical axis AB of revolution of the light intensifier 2, and the optical axis BX' of a first eyepiece 3, of the eyepiece for the left eye in the example illustrated. An entrance objective 1 can be disposed either on the viewing axis AX or on the axis of the tube 2. It can also, as illustrated, be composed of two elements $1_a$ and $1_b$, the first being located on the viewing axis AX and the second on the axis of the tube 2.

The objective and the eyepiece are bent, respectively:
at A with the aid of a plane reflector 4 disposed between the entrance optical elements $1_a$ and $1_b$, then constituting a bent objective;
at B with the aid of a second plane reflector 5, parallel to the first reflector 4, so that the two reflectors form a rhombohedron, the optical axis BX' of the eyepiece then being parallel to the viewing axis AX.

Between the light intensifier 2 and the eyepiece 3 there is provided an optical combination with image transport for transmission of the light flux originating from the observed scene. In this first example embodiment, this image transport is composed of two optical elements 6 and 7, the optical elements 6 and 7 and the eyepiece 3 being optically computed so as to form for example an eyepiece assembly of microscope type, that is to say with formation of an intermediate image.

In order to constitute a second eyepiece optical pathway going to the other eye, the right eye in the case of the example illustrated, there is provided at the point 0 of the central span AB of the principal pathway, an inclined pathway splitter 8 which diverts half of the incident light flux to a second eyepiece 9, in this instance the eyepiece for the right eye.

Two eyepiece pathways are thus created onwards of the splitter 8: a first eyepiece pathway with axis OBX', for the left eye in the example illustrated in FIG. 1, and a second eyepiece pathway with axis OCDY for the right eye.

The first eyepiece pathway, consisting of the image transport 6, 7 and the eyepiece 3, extends the principal pathway and the light flux is transmitted partially on this pathway through the pathway splitter. The second pathway is followed by the light flux reflected by the splitter 8.

In order to transmit the light up to the second eyepiece, the second eyepiece pathway includes an image transport optic: for example, optical elements 10 and 11 are placed between the splitter 8 and the second eyepiece 9 and are computed such that the optical elements 6, 10 and 11 constitute a single image transport optic. The image transport 6, 10, 11 likewise forms, with the eyepiece 9, a microscope type eyepiece assembly. Under these conditions, the two eyepiece pathways each consist of an image transport having a common element, the element 6 and of an eyepiece.

The term "optical element" used in this description signifies optical or lens group composed of a suitable number of thin lenses (at least one) whose geometrical and optical characteristics are computed so as to obtain the desired optical effects (convergence, correction of optical aberrations). The optical computation comes within the know-how of those skilled in the art.

The secondary optical pathway which will be grafted at the point 0 onto the principal optical pathway X'OX has in the example embodiment, onwards of the pathway splitter 8, an optical axis OCDY likewise bent twice about three spans. The optical axis of the second eyepiece 9, which coincides with the span DY of the secondary optical pathway, is parallel to the optical axis BX' of the first eyepiece 3. Under these conditions, the axes of the eyepieces BX' and DY are parallel and are aligned with the axes of vision of the eyes of the observer Y1 and Y2. The axes BX' and DY thus define a reference plane of vision for the user, in general horizontal.

To obtain correct orientation of the image exiting the eyepieces, the intensifier is a tube without image inversion.

In the example embodiment illustrated, the first optical bend C of the second eyepiece pathway is produced with the aid of a roof prism 12, located between the two elements 10 and 11 of the image transport, and the second bend D with the aid of a second roof prism 13 located between the last element 11 of this image transport and the second eyepiece 9. The optical axes of the final portions of the principal and secondary pathways, BX' and DY, which coincide with the optical axes of revolution of the eyepieces, are thus rendered parallel to the axis of viewing AX and define a horizontal plane.

In this example embodiment, the reflectors and the prisms are disposed at 45° to the optical axes, so that the optical bends each form a 90° angle. The pathway splitter 8 is disposed in a manner inclined to the central portion AB, so that the optical axis OC of the light flux diverted by the splitter 8 is perpendicular to the axis AB of the intensifier 2, and that the portions with axis AB and OC are in one and the same plane perpendicular to the viewing axis AX.

The splitting of pathways, effected by dividing the light flux, can be achieved either by splitting of pupils, for example by using a reflecting element on a half-pupil of the principal optical pathway, or by employing a semi-reflecting treatment or spectral band splitter, deposited on a plane plate or a splitter cube.

The plane reflectors are, for their part, produced by any technique known to those skilled in the art, for example from plane plates having undergone a reflecting treatment (metallic, dielectric or holographic), or from half-cube prisms used in total internal reflection or having undergone a reflecting treatment of the same type.

The optical architecture just described is embodied in such a way that the principal span AB of the principal optical axis is inclined by an angle of around 30° above the horizontal plane formed by the optical axes of the eyepieces. It is this inclination which makes it possible to clear a space sufficient to insert, under the principal optical pathway coupled to the first eyepiece, a second optical pathway coupled to the second eyepiece. This inclination thus allows the best possible management of space so as to obtain minimum bulkiness.

According to a variant embodiment of the right eyepiece pathway coupled to the right eyepiece, the roof prisms are replaced by plane reflectors and the image transport, consisting of the three elements 6, 10 and 11, is replaced by two image transports. A first transport composed of the elements 6 and 10, which forms at the reflector 12 an intermediate image of the screen of the intensifier, and a second transport composed of the element 11 which recasts this image so as to deliver an erect image to the right eyepiece 9.

Figure 2:
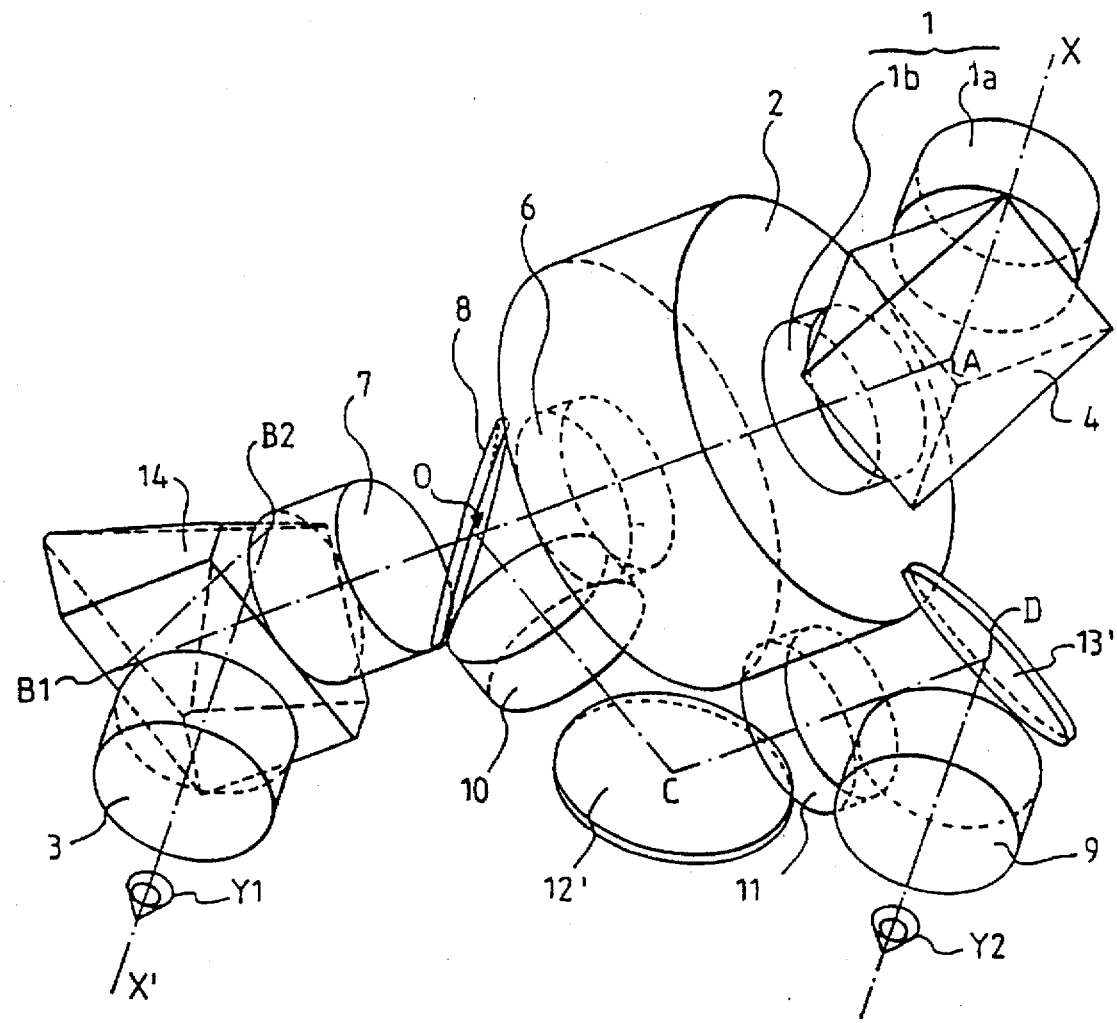
FIG. 2, a second example embodiment of the binoculars according to the invention.

Another example embodiment, illustrated in FIG. 2, in which the elements which are common with those of FIG. 1 are indicated with the same reference signs, is based on the use of an intensifier with image inversion. This inversion, which corresponds to a rotation of the image by 180° in its plane, is obtained by virtue of so-called inverting optical fibres incorporated into the intensifier, according to techniques. Under these conditions, and in order to deliver erect images to the eyepieces, the plane reflector 5 of FIG. 1 is replaced by a roof pentaprism 14, the bend B then being obtained with the aid of a double reflection at B1, and B2 so as to reverse the image, and the roof prisms 12 and 13 of the secondary eyepiece pathway are replaced by two plane reflectors 12' and 13' respectively.

According to a variant of this second example embodiment and in order to reduce the bulkiness, the pentaprism 14 can be replaced by a plane reflector such as the reflector 5 of FIG. 1. Moreover, the image transport of the principal pathway, consisting of the elements 6 and 7, is computed such that the elements 6, 7 and 3 form a single eyepiece assembly of the magnifying glass type, that is to say without intermediate image formation and without the appearance of eye-rings. This solution becomes extremely compact since the elements 3, 6 and 7 then have very reduced thickness dimensions.

The invention is not limited to the examples described and illustrated: it is possible to invert the right and left pathways with respect to the solutions described above; it is also possible to dispose the principal optical axis under the horizontal plane of the axes of the eyepieces, producing an optical combination of the same type, but symmetric with respect to this plane.

We claim:

1. Binoculars for nighttime vision including an entrance objective conjugate with a light-intensifier tube for forming an image of a scene from light flux originating from the scene along a viewing axis, an intensified image next being transmitted by an image transport and by an optical splitter which partially transmits the flux by transmission and reflection respectively on a first pathway to a first eyepiece and on a second pathway, which is bent twice, to a second eyepiece, the eyepieces having axes parallel to the viewing axis, characterized in that the tube and the image transport are aligned so as to constitute a principal optical pathway along a principal optical axis lying in a plane perpendicular to the viewing axis and inclined with respect to the plane of the axes of the eyepieces, in that the second eyepiece pathway, which is bent twice and which has an axis lying in the plane perpendicular to the viewing axis and passing through the axis of the principal pathway.

2. Binoculars according to claim 1, characterized in that the image transport includes a first common optical element located between the tube and the pathway splitter and two second elements located on each of the eyepiece pathways, the pathway splitter being disposed between the first element and the second elements.

3. Binoculars according to claim 2, characterized in that the tube is an intensifier tube without image inversion and in that the bend of the first eyepiece is bent by a plane reflector.

4. Binoculars according to claim 3, characterized in that the flux is transmitted on the second eyepiece pathway, with the aid of optical elements constituting a single image transport optically coupled to two roof prisms.

5. Binoculars according to claim 3, characterized in that the flux is transmitted on the second eyepiece pathway, with the aid of optical elements constituting two image transports.

6. Binoculars according to claim 1, characterized in that the tube is an image inverting intensifier tube and in that the flux is transmitted on the second eyepiece pathway by optical elements constituting a single image transport optically coupled to two plane reflectors.

7. Binoculars according to claim 6, characterized in that the optical bend is effected on the first eyepiece pathway by reflection on a roof reflector of pentaprism type.

8. Binoculars according to claim 6, characterized in that the flux is transmitted on the first eyepiece pathway with the aid of optical elements constituting an eyepiece of the magnifying glass type for direct transmission of the image formed by the tube.

* * * * *